Oct. 20, 1942.                O. R. SCHOENROCK                2,299,351
                                UNIVERSAL JOINT
                              Filed July 2, 1941                2 Sheets-Sheet 2
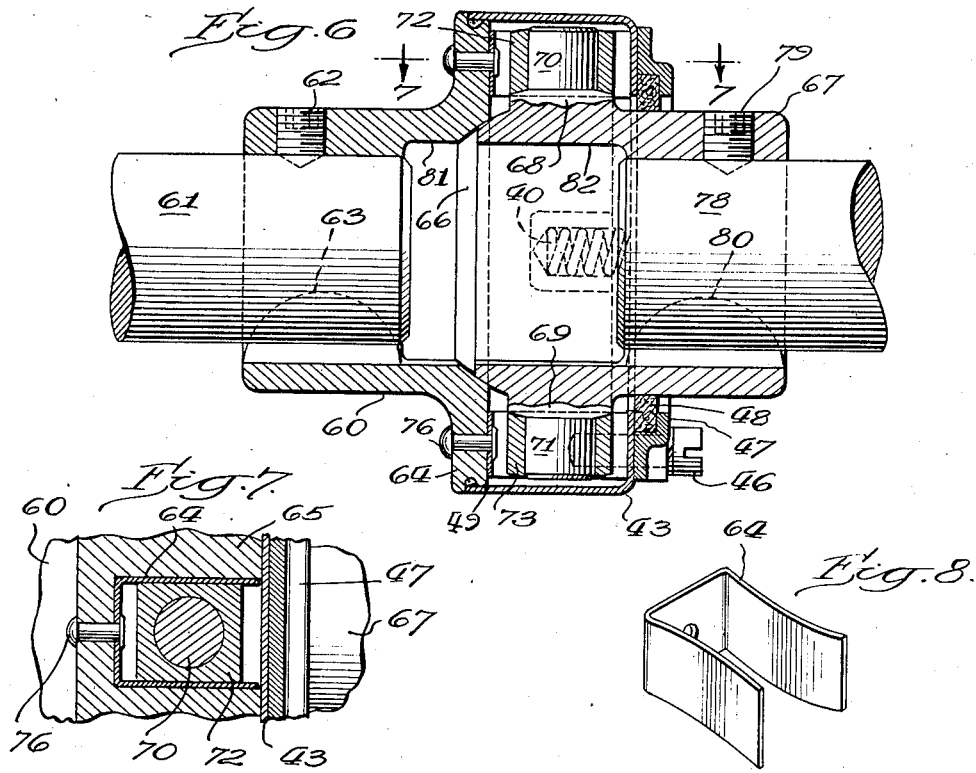
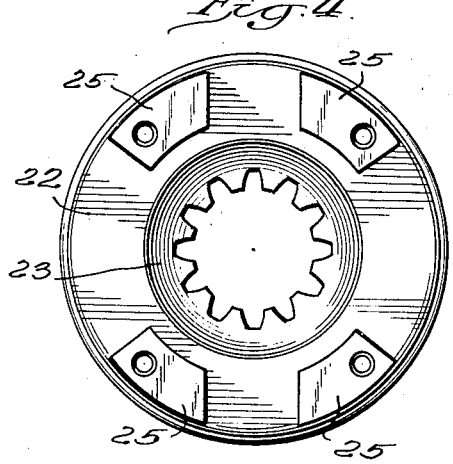
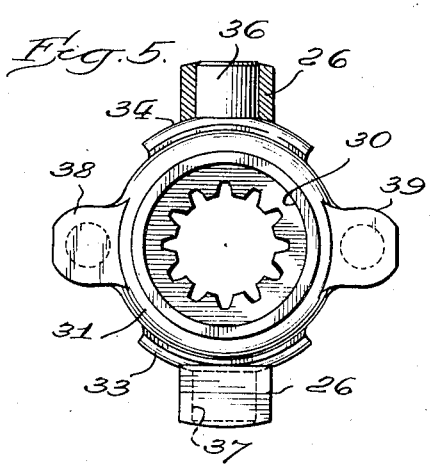
Inventor.
Otto R. Schoenrock
By
McCaleb Hundt & Dickinson
Attys Patented Oct. 20, 1942

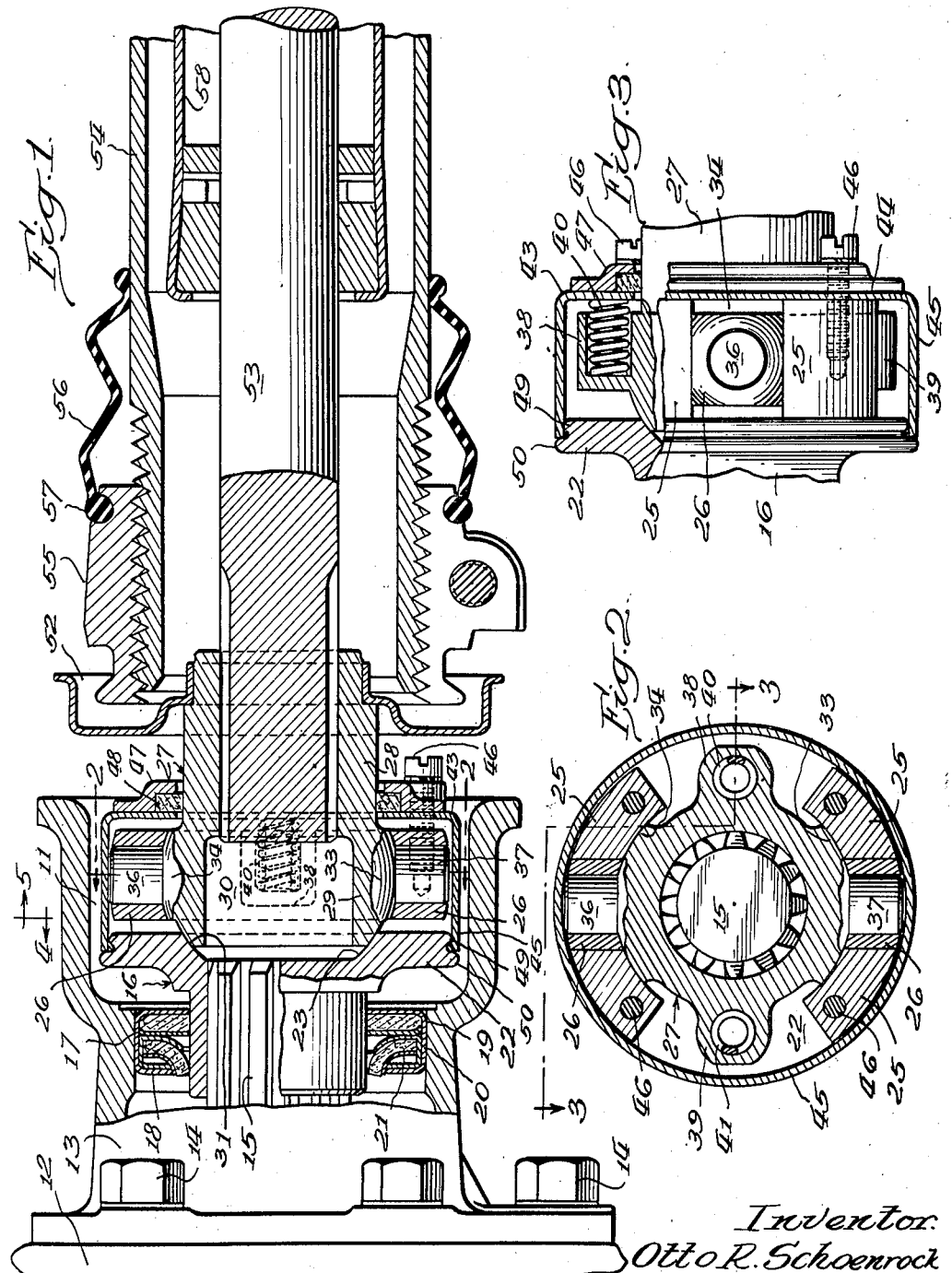

2,299,351

UNITED STATES PATENT OFFICE 2,299,351

UNIVERSAL JOINT

Otto R. Schoenrock, Chicago, Ill., assignor to Aetna Ball Bearing Manufacturing Company, Chicago, Ill., a corporation of Illinois Application July 2, 1941, Serial No. 400,783

9 Claims. (Cl. 64—7)

My present invention relates to universal joints and more especially—although not necessarily—to that type of basically two-member ball-and-socket joint where the ball member carries trunnions journaled in bearing blocks which in turn are slidable in longitudinal slots in the socket member.

My invention is especially adaptable to the universal joints employed to connect the transmission drive shaft of an automobile to its propeller shaft.

Among the objects and features of my invention are the following:

My universal joint maintains the driving and driven shafts in such a position that their axes (or the projections of their axes) are always coincident at the center point of movement of the universal joint. That is, the axes are maintained so that they are either in alignment or intersect at the center point. This is important in the drive universal of an automobile, for example, in securing maximum smoothness and efficiency of operation as against losses by friction, flexing of the shafts, etc.

In addition to its torque transmission or drive through the trunnions of the ball member, and in addition to the previously mentioned maintenance of the axes of the shafts at the center point of pivotal movement of the joint, my joint also provides structure whereby one of the joint members is well adapted to receive and bear the thrust imparted to it by the other. This is of advantage in drives where the shafts are subject to endwise thrusts.

The socket member and ball member of my joint are resiliently maintained in endwise contact to avoid rattle and otherwise promote quiet and uniform operation, but this is done in such a way as not to require spherically conformed surfaces, both front and back, on the socket member. This considerably simplifies the structure and facilitates assembly and disassembly.

The spring take-up which I employ to hold the ball and socket members of the joint in endwise contact is so equalized in its action as not to bind the free operation of the working parts of the joint at any of their working positions.

My joint provides for receiving a controlled but adequate supply of lubricant from the transmission case—when employed in an automobile drive, for example—so long as there is a reasonable supply of lubricant in the transmission case. This control is effected in part by provision for creating a counter-pressure tending to limit an otherwise excess flow of lubricant into the joint, with a resulting economy of lubricant.

By means of a spring liner for the longitudinal slots of the socket member, within which the trunnion blocks slide, I provide a convenient and economical means of renewal after considerable wear without replacing the socket member, and I also thereby provide for absorbing rattle which might otherwise develop as a result of wear.

My universal joint may be quite open at the center to permit one, or preferably both, of the ball and socket members to be telescoped over the associated shaft. This, in many installations, will greatly facilitate assembly and disassembly, and in some installations will permit the removal of the universal joint from one of the shafts without taking the universal joint assembly apart.

These and further objects, features and advantages of my invention are set forth in the following description, and the accompanying illustrations, of specific embodiments thereof.

In the accompanying drawings, of which there are two sheets:

Fig. 1 is a fragmentary vertical sectional view taken axially of a universal joint assembly constructed in accordance with the present invention;

Fig. 2 is a fragmentary vertical sectional view taken as on the plane of the line 2—2 of Fig. 1;

Fig. 3 is a fragmentary elevational view partly broken away as on the offset plane of the broken line 3—3 of Fig. 2, a cup-shaped shield being broken away on a median plane to disclose the inner structure;

Fig. 4 is an end elevational view, as the end of a left-hand joint member would appear with the parts separated on the plane of the line 4—5 of Fig. 1, viewing the member from its right end;

Fig. 5 is an end elevational view of a co-operating universal joint member with the parts separated on the plane of the line 4—5 of Fig. 1, viewing the member from its left end;

Fig. 6 is a fragmentary longitudinal axial section of a modified form of the invention;

Fig. 7 is an enlarged fragmentary sectional view taken on the plane of the line 7—7 of Fig. 6; and Fig. 8 is a similarly enlarged view in perspective of a spring clip employed in the modified form of the invention illustrated in Figs. 6 and 7.

Referring to the drawings in detail, a universal joint 11, as illustrated in Figs. 1 to 5, inclusive, is mounted in an automobile drive.

A transmission case 12 has a conventional joint shield and bearing support 13 mounted thereon by cap screws 14. The transmission drive shaft 15 has a splined rear end and has splined connection with a universal joint member 16.

An oil and dust seal 17 has an annular metal channel 18, in which are mounted a pair of sealing washers 19 and 20. The washer 20 is dished forwardly at its central edge and is pressed by a spring washer 21 into engagement with the periphery of the hub of the member 16.

An annular flange 22 is formed integrally with the hub of the member 16, the flange 22 having four posts 25 with concentric arcuate inner and outer faces disposed to form a skeletonized cylinder. The posts 25 are arranged in two similar pairs in diametrically opposed relation to each other, the adjacent faces of each pair being parallel to each other and polished to provide a bearing surface for trunnion blocks 26, later to be described.

The marginal surface about the splined axial opening in the hub of the member 16 is beveled arcuately to form a spherically socketed seat 23 with a radius of curvature which may be somewhat smaller than the inner radius of the skeletonized cylinder defined by the posts 25. The center of the sphere thus defined is located on the axis of the skeletonized cylinder.

A co-operating joint member, indicated generally by the numeral 27, includes an internally splined hub portion 28 and a head portion 29 with a cylindrical recess 30 therein coaxial with, but larger than, the splined opening in the hub portion 28. The face 31 of the head portion is spherically curved to fit the spherical socket 23.

A pair of spherically curved pads 33 and 34 are formed on opposite sides of the head portion 29, the center of spherical curvature thereof being concentric with that of the face 31, and the radius of curvature of these pads being equal to that of the inner radius of the skeletonized cylinder defined by the posts 25 so as to permit relative universal pivotal movement between the joint members 16 and 27 about the center of the sphere defined by the face 23.

A pair of trunnion posts 36 and 37 are provided, one on each of the pads 33 and 34, to project radially outward, the axes of these trunnion posts lying along a diameter of the sphere defined by the face 31.

A trunnion block 26 is mounted on each of the trunnion posts to pivot thereon. The inner faces of the trunnion blocks are each spherically curved to fit the faces of the pads 33 and 34, and the outer faces of the blocks are also spherically curved to have their center of curvature concentric with that of the surface 31 when mounted on the trunnion posts as illustrated.

The head portion 29 has a pair of laterally projecting recessed spring supports 38 and 39 located diametrically opposite to each other, and arcuately midway between the trunnion posts 36 and 37. The spring supports 38 and 39 are each provided with a cylindrical spring supporting recess therein disposed with their axes parallel to the central bore of the member 27.

Coil springs 40 and 41 are mounted in the recesses in the spring supports 38 and 39, respectively, the springs being held in compression against the bottoms of the recesses by a cup-shaped shield 43, having a circular head 44 and a cylindrical skirt 45.

The head 44 of the shield 43 rests upon the tops of the posts 25, to which it is secured by machine screws 46. These screws also pass through an annular gasket retaining ring 47 in which is mounted a sealing gasket 48, which may be of felt. The gasket 48 is held in sealing engagement against the periphery of the hub portion 28.

The skirt 45 of the shield 43 is of a length to fit over a bead 49 formed on the flanged portion 22 of the member 16, the bead 49 being adapted to fit closely within the skirt to form an oil-tight connection therewith.

A second larger bead 50 is formed beyond the sealing bead 49 to be engaged by the edge of the skirt 45. The groove between the beads 49 and 50 may be filled with a sealing material such as sealing cement.

A propeller shaft 53 has a splined end adapted to fit into the splined portion of the hub portion 28.

A dust shield 52 is of stamped sheet metal and has a press fit on to the reduced end of the hub portion 28.

A shaft guard tube 54 is mounted about the propeller shaft, and is provided with a split clamp nut 55 threaded onto the end of the tube 54. A rubber dust sleeve 56 has a bead 57 adapted to fit in a groove in the nut 55, to prevent endwise displacement of the shield. A stiffening tube 58 is mounted on the propeller shaft to prevent whipping or springing of the shaft.

In the modified form of the invention illustrated in Figs. 6, 7 and 8, a joint member 60 is mounted on a shaft 61 to which it is secured as by means of a set screw 62. A Woodruff key 63 may also be used to secure the parts against relative rotation.

The joint member 60 has a peripherally beaded flange 64 with four posts 65, which define a skeletonized cylinder similarly to the posts 25 previously described. The member 60 has a spherical socket 66 formed therein similarly to the socket 23 of Fig. 1, to receive the spherical end of a co-operating joint member 67 therein.

The member 67 is formed with a pair of pads 68 and 69 on diametrically opposite sides thereof, the pads having spherically curved faces, the radius of curvature of which is the same as the radius of the cylinder defined by the inner faces of the posts 25. Trunnion posts 70 and 71 project radially outward from the pads 68 and 69, respectively, the axes of the trunnion posts lying along a diameter of the sphere defined by the end of the member 67.

Trunnion blocks 72 and 73 are mounted to pivot on the trunnion posts 70 and 71, respectively, to have a close sliding fit between the legs of U-shaped springs 64, which are mounted as liners in the spaces between the parallel adjacent faces of the posts 65. The U-shaped springs may be secured in place as by rivets 76. The legs of the springs 64 are preferably curved outward slightly, as illustrated in Fig. 6, to compensate for wear as it occurs between the spring and its co-operating trunnion block to prevent rattles.

The joint member 67 is mounted on a shaft 78 to which it is secured as by a set screw 79. A Woodruff key 80 may be used as additional securing means between the joint member 67 and its shaft 78.

The joint member 67 is provided with laterally projecting recessed spring supports, and springs, similar to the supports 38 and 39 and their contained springs 40 and 41 of the construction illustrated in Figs. 2 and 3. The sheet metal closure cap 43, felt washer 48, washer-retaining ring 49, and screws 46 are all similar to those illustrated and described in the structure of Figs. 1 to 5, inclusive, so that the same numerals are employed for these parts throughout.

The central bores of the members 60 and 67 both are enlarged adjacent their contacting faces, as at 81 and 82, respectively. This construction permits either the member 60 or the member 67 to be moved slidably along its supporting shaft away from its co-operating joint member upon removing the screws 46 and releasing the set screws 62 (or 79) securing the member 60 (or 67).

The mounting of the trunnion posts with their axes along a diameter of the sphere defined by the ball face in contact with the co-operating spherical socket on the other member of the joint, insures smooth vibrationless operation at all speeds, and under severe operating conditions.

A radial offset between the faces of the trunnion pads and the spherical end of the trunnioned member provides a large bearing surface for the pads against the skeletonized cylindrical inner faces of the posts, as best illustrated in Fig. 2, and at the same time provides a concentric ball-and-socket connection between the parts of sufficiently small radius to shorten the overall length of the joint and to provide adequate to lateral forces, as best illustrated in Fig. 1. While this feature is considered important, it will be apparent that the joint can be readily constructed with the trunnion pads and spherical end face of the same radius, which may be desirable where simplification of structure is a factor.

The location of the compression springs 38 and 39 arcuately between the trunnions insures evenness of spring action since on an angular displacement of the joint-connected shafts, the spring pressure on the ball-and-socket connection is equalized by this arrangement.

The structure and mounting of the shield 43 seal the joint against loss of lubricant and the entrance of dust, and provides at the same time a compression seat for the springs 38 and 39 which, on removal of the screws 46, tend to force the shield 43 outwardly and thereby assist in its removal.

The joint structure may be balanced both statically and dynamically with a minimum of effort and cost, since all of its machined surfaces, with the exception of the trunnion posts, are either concentric or coaxial, and the trunnion posts are located on a diameter through the common center of the concentric portions.

In operation, the combined action of the springs and the co-operating spherical-cylindrical faces of the joint elements tends to center the parts about their axes of rotation, to provide vibrationless operation at high speeds. The co-operation of the spherical faces of the joint also resists end thrust, which is extremely important in an automobile drive mechanism such as that illustrated in Figs. 1 to 5, inclusive.

In the modified form illustrated in Figs. 6, 7 and 8, the breaking of the joint is of extreme simplicity and the enlargement of the bore at the adjoining ends of the joint members permits either of the joint members to be moved slidably along its shaft, when freed by removing the screws 46 and releasing the set screws 62 and 79.

In use of the joint illustrated in Figs. 1 to 5, inclusive, as an automobile drive connection, there occurs a very slight seepage of grease from the transmission case 12 along the splines of the shaft 15, whence it is thrown outwardly by centrifugal force along the spherical face 23 and works outwardly between the faces 23 and 31. A sufficient amount of this lubricant finds its way into the frictional surfaces of the trunnion posts, blocks and pads, to provide adequately for the proper lubrication of these parts, so that the joint is in this embodiment self-lubricating or at least self-replenishing after an initial lubrication. Any excess of lubricant tends to collect in the enlarged bore 30 of the member 27, and, since the splined opening in the member 27 is smaller in diameter than that in the member 16, such excess lubricant would, by centrifugal force, tend to force the excess back along the splines of the shaft 15, so as to prevent further leakage of the lubricant.

While I have illustrated and described a preferred embodiment of my invention, I do not wish to be limited to the precise forms set forth but desire to include all modifications within the scope of the appended claims.

I claim:

1. A universal joint having a driving and a driven member, one of said members having a spherical ball end portion and the other of said members having a spherical socket to receive said ball portion, the member having the ball portion having a pair of laterally projecting pads, the lateral surfaces of said pads having a spherical curvature concentric with said ball portion, a trunnion projecting laterally beyond each of said lateral pads, the axes of said trunnions lying along a diameter of the sphere defined by said lateral surfaces, trunnion blocks pivoted on said trunnions, and a skeletonized cylinder carried by the socketed member and enclosing said pads, said cylinder having substantially the same radius of curvature as the lateral spherical surfaces of said pads, and having longitudinal slots therein to receive said trunnion blocks for driving connection between said members.

2. A universal joint having a driving and a driven member, said members having cooperating spherical endwise portions interfitting for universal pivotal movement against thrust, one member having a spherical lateral portion concentric with its endwise portion, a cylindrical structure of the same diameter as the spherical lateral portion of the other member, said cylindrical structure having longitudinal slots therein, said one member being fitted within the cylindrical structure of the other member, means carried by said one member and having slidable driving engagement within the slotted opening in said cylindrical structure, and spring means retained in compression between oppositely disposed surfaces of said one member and said other member to urge said members toward endwise contact.

3. A universal joint having a driving and a driven member, each having an axial bore therethrough, one member having a spherical lateral portion concentric with its axial bore, a cylindrical structure of the same diameter as the spherical lateral surface on the other member, said cylindrical structure being co-axial with the axial bore of said other member, said cylindrical structure having longitudinal slots therein, said one member being fitted within the cylindrical structure of the other member, means carried by said one member and having slidable driving engagement within the slotted opening in said cylindrical structure, a grease retaining shield completely enclosing said cylindrical structure and having resilient sealing engagement with said one member, and spring means retained in compression between oppositely disposed portions of said one member and said other member to urge said members toward endwise contact.

4. A universal joint having a driving and a driven member, said members having cooperating spherical endwise portions interfitting along a spherically curved annular band for universal pivotal movement against thrust, one member having a spherical lateral portion concentric with but of greater diameter than the spherical endwise portion of said one member, a cylindrical structure on the other member of similar diameter to said spherical lateral portion of said one member, said one member being fitted within the cylindrical structure of the other member, slidable driving connection between the driving and the driven member, and resilient means acting between the driving and the driven member to urge the members toward endwise contact.

5. A universal joint having a driving and a driven member, said members having cooperative respective concave and convex spherical endwise portions interfitting along a spherically curved annular band for universal pivotal movement, a lateral spherical portion on the member having the convex spherical end portion, trunnion drive means projecting beyond said lateral spherical portion, and a skeletonized cylinder carried by the other member than that supporting said trunnions to enclose the lateral spherical portion of said trunnioned member and slidably to receive the trunnion drive means for driving engagement therewith.

6. A universal joint having a driving and a driven member, said members having cooperative respective concave and convex spherical endwise portions interfitting along a spherically curved annular band for universal pivotal movement, a lateral spherical portion on the member having the convex spherical end portion, trunnion drive means projecting beyond said lateral spherical portion, a skeletonized cylinder carried by the other member than that supporting said trunnions to enclose the lateral spherical portion of said trunnioned member and slidably to receive the trunnion drive means for driving engagement therewith, and spring means operatively mounted between the driving and the driven members to urge said members toward endwise contact.

7. A universal joint having a driving and a driven member, each of said members having an axial bore to receive a shaft, said members having cooperating spherical endwise portions interfitting along an annular band radially beyond the axial bores of said members for universal pivotal movement against thrust, means for retaining said members against lateral displacement, driving connection between said members, the surface of said endwise portions being divergent axially inwardly from said annular band to form a lubricant channel to receive lubricant fed into the joint through an axial bore of one member, said lubricant being fed outwardly from said channel by centrifugal force into said cooperating spherical surfaces during a rotation of the joint.

8. A universal joint having a driving and a driven member, each of said members having an axial bore to receive a shaft, said members having cooperating spherical endwise portions interfitting along an annular band radially beyond the axial bores of said members for universal pivotal movement against thrust, means for retaining said members against lateral displacement, driving connection between said members, the surfaces of said endwise portions being divergent axially inwardly from said annular band to form a lubricant channel, lubricant being fed outwardly from said channel by centrifugal force, into said cooperating spherical surfaces during a rotation of the joint.

9. A universal joint having a driving and a driven member, each of said members having an axial bore to receive a shaft, at least one of said members having the bore extending, without reduction or impediment, entirely lengthwise therethrough to provide for telescopic movement of such member on a supporting shaft, said members having cooperating spherical endwise portions interfitting along an annular band radially beyond the axial bores of said members for universal pivotal movement against thrust, means for retaining said members against lateral displacement, driving connection between said members, the surface of said endwise portions being divergent axially inwardly from said annular band to form a lubricant channel to receive lubricant fed into the joint through an axial bore of one member, said lubricant being fed outwardly from said channel by centrifugal force into said cooperating spherical surfaces during a rotation of the joint.

OTTO R. SCHOENROCK.